US006572284B2

(12) United States Patent
Bauer

(10) Patent No.: US 6,572,284 B2
(45) Date of Patent: Jun. 3, 2003

(54) QUEUE MANAGEMENT FOR PHOTO MINILABS

(75) Inventor: Stephen W. Bauer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/953,481

(22) Filed: Sep. 12, 2001

(65) Prior Publication Data

US 2003/0049032 A1 Mar. 13, 2003

(51) Int. Cl.7 ........................... G03D 3/00; G03B 27/52

(52) U.S. Cl. ........................... 396/564; 355/27; 355/40; 355/41; 355/77; 101/248; 709/100; 709/101; 709/102

(58) Field of Search ............................... 355/27–29, 40, 355/41, 77; 101/248; 345/690; 399/8; 709/100; 396/564

(56) References Cited

U.S. PATENT DOCUMENTS

| | | | | | |
|---|---|---|---|---|---|
| 4,839,829 | A | * | 6/1989 | Freedman | 101/248 |
| 5,036,361 | A | * | 7/1991 | Filion et al. | 345/690 |
| 5,291,420 | A | * | 3/1994 | Matsumoto et al. | 399/8 |
| 5,907,391 | A | * | 5/1999 | Kobayashi et al. | 355/40 |
| 5,974,401 | A | * | 10/1999 | Enomoto et al. | 355/40 |
| 6,147,742 | A | * | 11/2000 | Bell et al. | 355/27 |

FOREIGN PATENT DOCUMENTS

| | | | |
|---|---|---|---|
| EP | 1061722 | * | 12/2000 |
| JP | 11-31158 | * | 2/1999 |
| JP | 2001-209738 | * | 8/2001 |

* cited by examiner

*Primary Examiner*—D Rutledge

(57) ABSTRACT

A photo minilab includes a computer or other device for estimating processing times of jobs accepted by the minilab.

28 Claims, 2 Drawing Sheets

QUEUE MANAGEMENT FOR PHOTO MINILABS

BACKGROUND

The present invention relates to photo minilabs. More specifically, the present invention relates to queue management for photo minilabs.

Photo minilabs offer quality processing of camera film with a quick turnaround. Customers drop off rolls of film at photo minilabs, and usually pick up prints the same day.

Many photo minilabs promise a one-hour turnaround. However, a photo minilab might break that promise if it has a large backlog of jobs. Broken promises can leave customers angry. The broken promises are also costly to photo minilabs that give partial refunds or discounts to customers whose jobs aren't completed within the promised time.

SUMMARY

According to one aspect of the present invention, a photo minilab includes a computer or other device for estimating processing times of jobs accepted by the minilab. This device gives customers a better estimate of when their prints will be ready for pick-up. The device also reduces the likelihood that promises will be broken and it reduces the costs associated with those broken promises.

Other aspects and advantages of the present invention will become apparent from the following detailed description, taken in conjunction with the accompanying drawings, illustrating by way of example the principles of the present invention.

DETAILED DESCRIPTION

Figure 1:
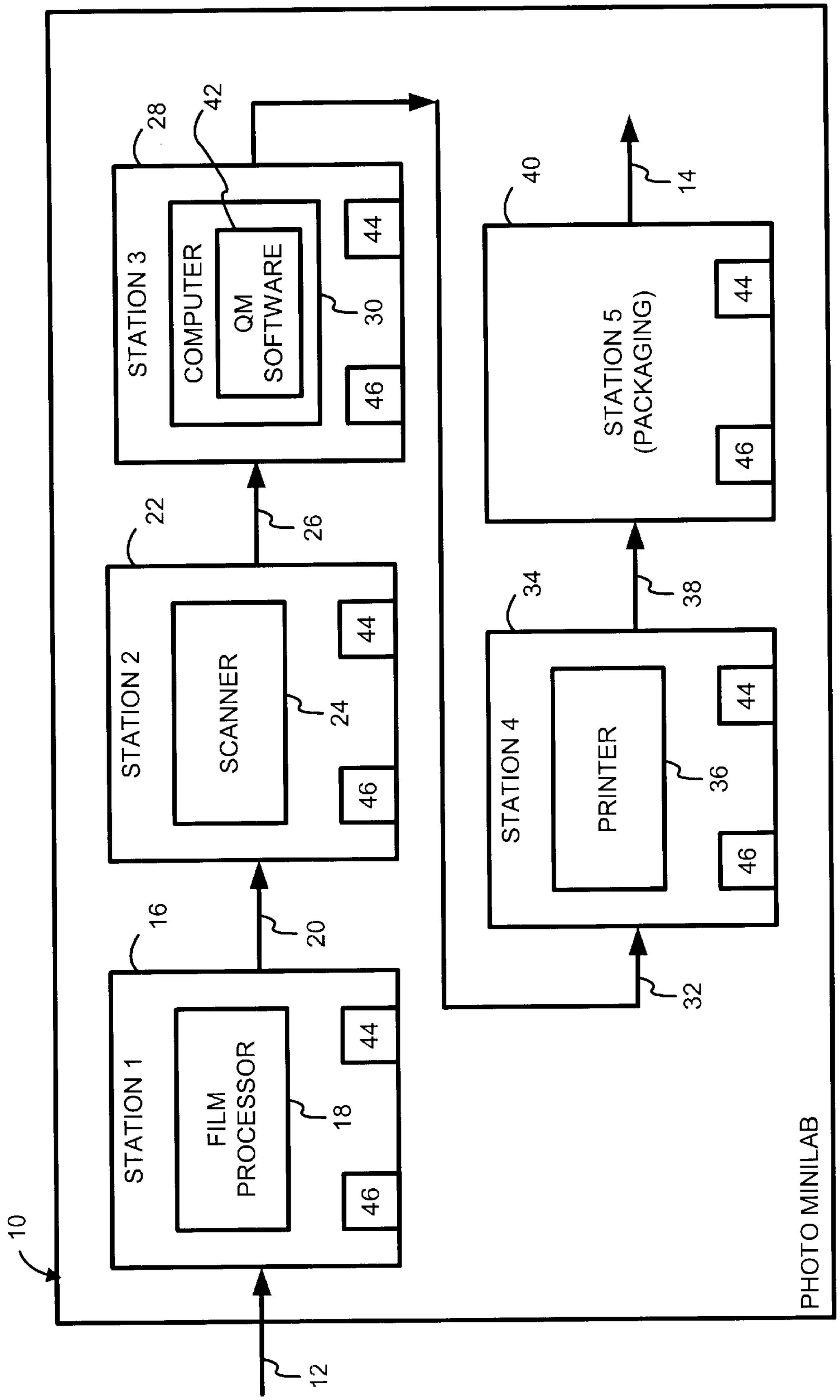
FIG. 1 is an illustration of a photo minilab according to the present invention.

As shown in the drawings for purposes of illustration, the present invention is embodied in a digital photo minilab. Digital photo minilabs offer several advantages over conventional analog minilabs. Conventional analog minilabs process film and create prints on silver halide paper. Digital minilabs, by contrast, digitize film, and also accept digital input such as digital camera storage cards and floppy disks. The digital minilabs use inkjet technology to make prints. The inkjet technology does not use any hazardous chemicals. This makes the digital minilabs environmentally safer than analog minilabs. Conventional analog minilabs offer only a few options for editing images, such as color balancing, whereas digital minilabs allow for a wide variety of image processing, such as color correction, sharpening, image editing, red eye elimination, color saturation, and merging of images into greeting cards.

Referring to FIG. 1, a digital photo minilab 10 includes five stations for processing camera film 12 into prints 14. After a customer drops off camera film at the minilab 10, the film 12 is brought to the first station 16. At the first station 16, a film processor 18 makes negatives 20 from the film 12. The negatives 20 are taken to the second station 22, where the negatives 20 are fed into a negative scanner 24. The negative scanner 24 converts the negatives 20 into digital data 26 and supplies the data 26 to a computer 30, which is located at the third station 28. The computer 30 displays the data as images on its video monitor. The computer 30 may be used to perform color correction on the digital images (e.g., RGB correction), touch-up (e.g., red eye removal), and other edits. After the images have been edited, the modified data is converted to printer data 32, and the printer data 32 is sent to a printer 36. Located at the fourth station 34, the printer 36 prints out one or more images onto a print medium such as photo paper. The printed medium 38 is taken to the fifth station 40 for packaging. The packaging may include slitting photo paper into individual prints (e.g., wallet-sized prints, 5×7 prints), laminating the prints, and placing the laminated prints 14 into envelopes. The envelopes may be placed in a bin for customer pickup.

The photo minilab 10 is staffed by one or more people (there is no limitation on how the minilab 10 is staffed). For instance, the different stations 16, 22, 28, 34 and 40 might be staffed by different people; multiple people might be assigned to each station 16, 22, 28, 34 and 40; the minilab 10 might be staffed by a single person who is responsible for each station; etc.

The photo minilab 10 is likely to process more than one job any given time. The photo minilab 10 is also likely to have a backlog of jobs. The backlog results from limitations of the machines, as well as limitations on the speed and efficiency of the staff.

Limitations of the negative scanner 24 include the speed at which the scanner scans in the negatives. Limitations of the printer 36 include the speed at which prints are made. A high quality inkjet printer, for example, might be able to make high quality 4×6 color prints at a speed of 40 to as many as 20,000 per hour. It may also have scheduled maintenance needs.

Limitations of the staff include the speed of editing the digital images, the speed at which media is moved between stations, the speed at which packaging is performed, lunch breaks, etc. Moreover, different people work at different speeds under different conditions. Consequently, the limitations of the staff are less predictable than the limitations of the machines.

These limitations can create bottlenecks at certain stations and inactivity at other stations. As a first example, a large number of jobs is received within a short period of time, whereby a queue forms at the first station 16. As a second example, the negative scanner goes off-line, whereby a queue forms at the second station 22. As a third example, an excessive amount of time is spent on color correction, whereby the printer 36 is idle while a queue forms at the third station 28. As a fourth example, little to no editing is performed, and the printer 36 cannot keep up with the data being supplied to it. Thus a queue forms at the fourth station 34. As a fifth example, a staff member at the fifth station 40 takes a break while prints are being printed. Consequently, a queue forms at the fifth station 40.

The computer 30 may be programmed with software 42 for performing queue management. The queue management software 42 estimates processing time and completion time for each job accepted by the minilab 10. The estimates may be based on statistics for each station 16, 22, 28, 34 and 40 and the length of each queue for each station 16, 22, 28, 34 and 40. Statistics for each station 16, 22, 28, 34 and 40 may be broken down into statistics for each machine, and statistics for each staff member. Statistics such as means and standard deviations may be used.

Figure 2:
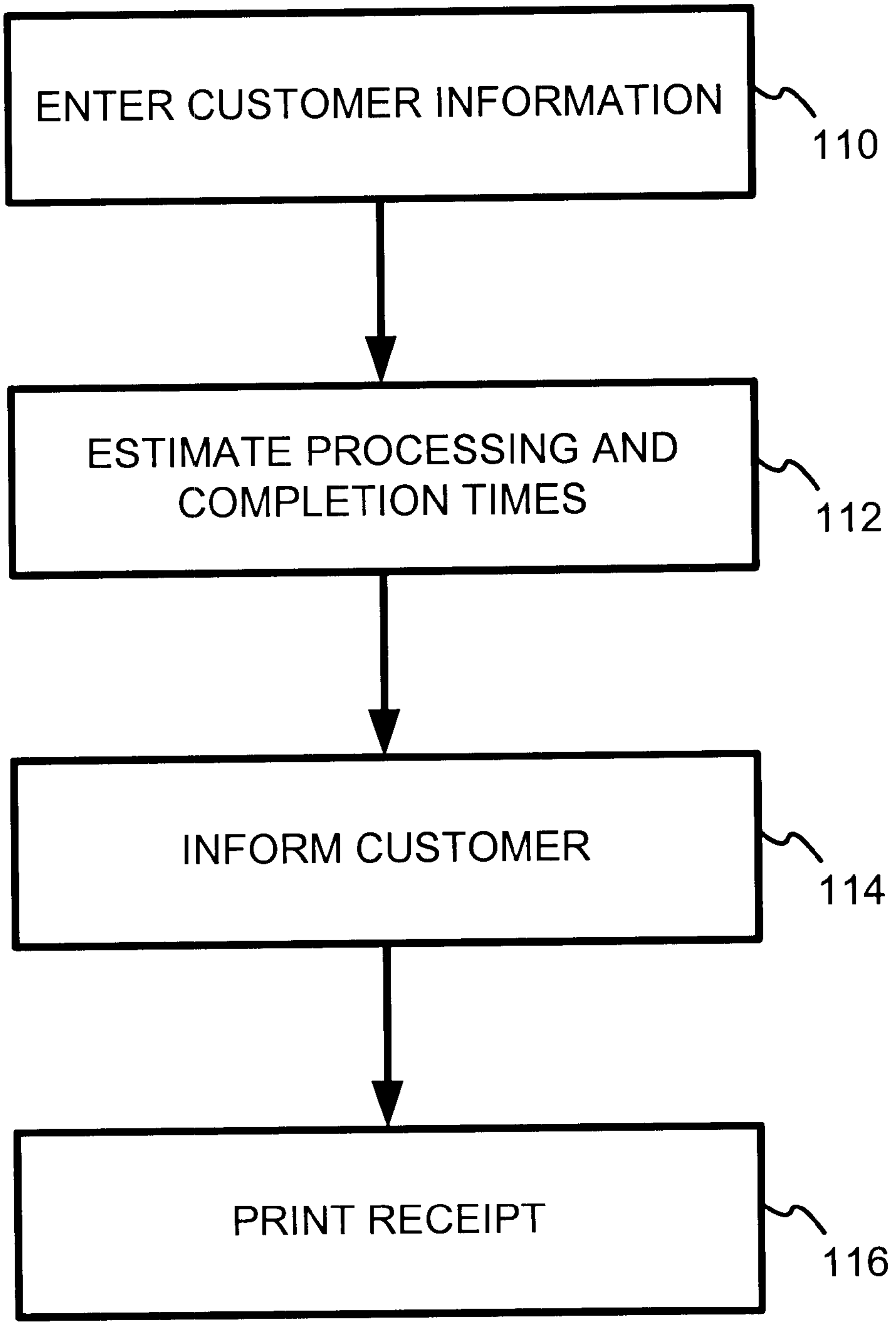
FIG. 2 is an illustration of a method of queue management for the photo minilab.

Additional reference is made to FIG. 2, which describes the steps performed after a customer drops off a job. The customer or a staff member enters the number of rolls dropped off, and the number of pictures per roll (110). The print format and the numbers of prints (e.g., slides, ten wallet-sized photos, two 8×11 photos, five 3×5 photos) are also entered (110). This information may be entered into the computer 30 via a remote terminal.

Once the information has been entered, the computer 30 estimates the processing time and completion time for the job (112). The completion time ($t_{done}$) may be estimated as follows:

$$t_{done}=t_{start}+t_{in\text{-}progress}+t_{queue}+t_{new}+t_{margin}$$

where $t_{start}$ is the start time, $t_{in\text{-}progress}$ is the time to process jobs already in progress, $t_{queue}$ is the delay due to queues, $t_{new}$ is the time to process the new job, and $t_{margin}$ allows for a margin of error.

For each station, each time may be based on statistics for the machine and statistics for the employee, as well as external variables (staff member break-time, machine down-time, minilab closing-time). If the variables are based on means and standard deviations, the computer 30 may compute completion times ($t_{done}$) based on 1-sigma, two-sigma and three-sigma guarantees.

The estimated completion time is communicated to the customer (114). This estimated time is a function of the statistical and real time data collected. Different guarantees could be communicated to the customer. For example, if the mean is sixty minutes and the standard deviation is ten minutes, the customer could be given a 95% guarantee that that the prints will ready within eighty minutes and that the prints will almost certainly be ready in ninety minutes. Or, the customer could be given a single estimate based on the mean and a selected standard deviation. Selecting the standard deviation involves a tradeoff between providing an accurate estimate and asking the customers to wait too long. High accuracy reduces the likelihood that the photo minilab 10 will incur costs associated with broken promises; long wait times might result in lost business. The minilab owner can select the standard deviation that provides the best tradeoff.

The printer 36 can print a receipt indicating the details of the job (116). This receipt informs the customer exactly what was ordered (e.g., 2 sets of twenty four 4×6 prints). The receipt can also indicate the information entered by the customer. For instance, when the negative scanner 24 reads a roll of film, it determines the number of images (e.g., 12/24/27/36) on the roll. That number can be added to the receipt.

The photo minilab 10 of FIG. 1 also includes a feedback system, which provides feedback for refining the statistics and increasing accuracy of the estimates. The feedback system may be implemented as a combination of sensors 44 and manual input devices 46. The sensors 44 can measure the performance of the machines and operators. For instance, sensors 44 can measure the actual speeds of the negative scanner 24 and printer 36 instead of relying on the manufacturer's specifications. Such sensors 44 might include, without limitation, input and output light curtains, LANs that poll machines at the beginning and ending of jobs, vision systems with people recognition software and object identification software for monitoring work areas, and barcode readers for tracking jobs as the jobs are received in input trays and placed in output trays.

Manual inputs may be entered by staff members via terminals 46 at the different stations. The manual inputs might indicate times for performing tasks such as preparing negatives, image editing, packaging, transporting prints from the printer 36 to the packaging station 40, etc. Tasks such as image editing will usually have a larger standard deviation than straightforward tasks such as packaging. Manual inputs might also include time stamps indicating the beginning and ending of lunch breaks, and codes identifying staff members.

Statistics may be kept for each staff member. If a certain staff member is on duty, the computer 30 may use the statistics for that staff member.

A digital photo minilab according to the present invention is not limited to the five stations described above. For instance, the negative and scanning stations can be bypassed if digital data is presented to the photo minilab. Digital camera and scanner users may be able to drop off their digital media at the minilab, or the digital information may be transmitted via the Internet.

The end product of the minilab is not limited to prints and slides. A minilab according to the present invention may offer thumbnail index sheets, photo greeting cards, enlargements, photo captions, frames, collages, etc. It may offer services such as uploading on the Internet.

The queue management software is not limited to the same computer that is used for image editing. It could be integrated with the printer, executed by another computer (e.g., a server, a non-networked desktop computer) at another station, etc.

The queue management software is not limited to digital minilabs. It may be used to estimate processing time and completion time for jobs accepted by analog minilabs. The queue management software may use statistical information to estimate the performance times for each analog minilab station, as well as feedback information to update the statistical information.

The present invention is not limited to the specific embodiments described above. Instead, the present invention is construed according to the claims the follow.

What is claimed:

1. A photo minilab comprising a device for estimating processing times of jobs accepted by the minilab, the estimated times based on past performance of the minilab.

2. A photo minilab comprising a device for estimating processing times of jobs accepted by the minilab, the processing times estimated according to estimated performance times for each minilab station.

3. The photo minilab of claim 2, wherein the device uses statistical information to estimate the performance times.

4. The photo minilab of claim 3, further comprising a feedback system for updating the statistical information.

5. The photo minilab of claim 4, wherein the feedback system includes sensors for gathering information about photo minilab machines.

6. The photo minilab of claim 4, wherein the feedback system includes manual input devices for gathering information about tasks performed by photo minilab staff members.

7. The photo minilab of claim 6, wherein different statistics are kept and used for different staff members.

8. The photo minilab of claim 2, further comprising a printer for printing out the jobs, the device estimating printer performance time.

9. The photo minilab of claim 8, wherein the device is integrated with the printer.

10. The photo minilab of claim 2, further comprising a packaging station for packaging the printed jobs, the device estimating packaging performance time.

11. The photo minilab of claim 2, further comprising a station for image editing, the device estimating image editing time.

12. The photo minilab of claim 11, wherein the image editing station includes a computer for performing the image editing, the device being integrated with the computer.

13. The photo minilab of claim 2, further comprising stations for developing and scanning negatives, the device estimating the performance times of the developing and scanning stations.

14. The photo minilab of claim 2, wherein the estimated performance times are based on past performance of the photo minilab.

15. Apparatus for a photo minilab, the apparatus comprising a processor for using statistical information to estimate performance time for each station of the minilab, the processor using each estimate to estimate completion times for jobs accepted by the minilab.

16. The apparatus of claim 15, further comprising a feedback system for updating the statistical information.

17. The apparatus of claim 16, wherein the feedback system includes sensors for gathering information about photo minilab machines.

18. The apparatus of claim 16, wherein the feedback system includes manual input devices for gathering information about tasks performed by photo minilab staff members.

19. The apparatus of claim 15, wherein one of the stations includes a printer; and wherein processor is also used by the printer.

20. The apparatus of claim 15, wherein the processor is also programmed to perform image editing, whereby generating the estimates and image editing are integrated at a single station.

21. The apparatus of claim 15, wherein estimated performance time is based on past performance of the photo minilab.

22. An article for photo minilabs, the article comprising computer memory encoded with a program for using statistical information to estimate performances time for each station of the minilab, and for using the estimated performance times to generate estimates of completion times of jobs accepted by the minilabs.

23. The article of claim 22, wherein estimated performance time is based on of the photo minilab.

24. A method for a photo minilab, the method comprising using statistical information about different stations of the photo minilab to estimate processing time of jobs accepted by the minilab, the statistical information based on past performance of the minilab.

25. The method of claim 24, further comprising communicating at least one guarantee to a customer, the guarantee based on the statistical information.

26. The method of claim 24, further comprising obtaining feedback information and using the feedback information to refine the statistical information.

27. The method of claim 26, wherein sensors are used to gather feedback information about photo minilab machines.

28. The method of claim 26, wherein manual input devices are used to gather feedback information about tasks performed by photo minilab staff members.

* * * * *

UNITED STATES PATENT AND TRADEMARK OFFICE

CERTIFICATE OF CORRECTION

PATENT NO. : 6,572,284 B2

DATED : June 3, 2003

INVENTOR(S) : Stephen W. Bauer

It is certified that error appears in the above-identified patent and that said Letters Patent is hereby corrected as shown below:

Column 6,

Line 12, after "on" insert -- past performance --

Signed and Sealed this

Fourth Day of January, 2005

JON W. DUDAS

*Director of the United States Patent and Trademark Office*